April 28, 1964 A. HUET 3,130,779
LIGHT BOILER FOR NUCLEAR ENERGY INSTALLATION
Filed April 29, 1959 2 Sheets-Sheet 2
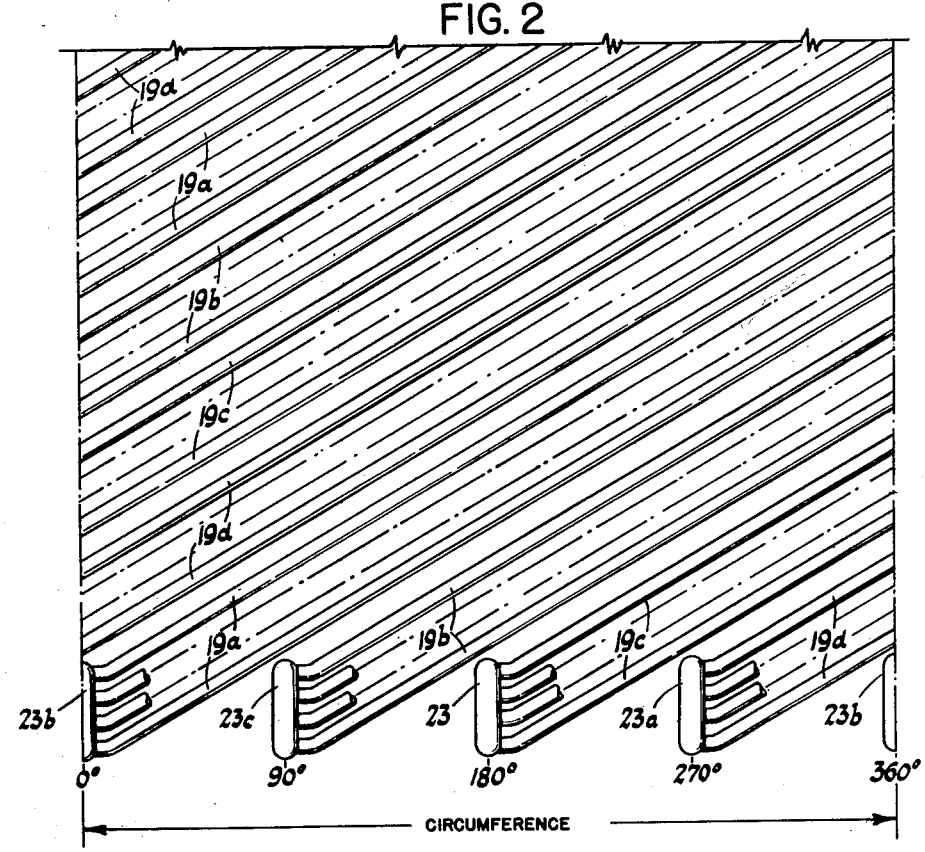
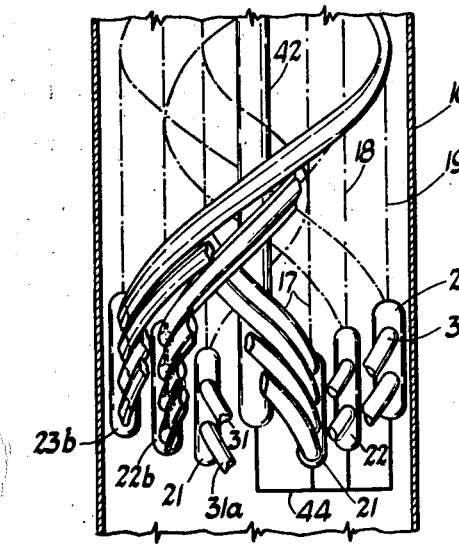
INVENTOR
ANDRE HUET

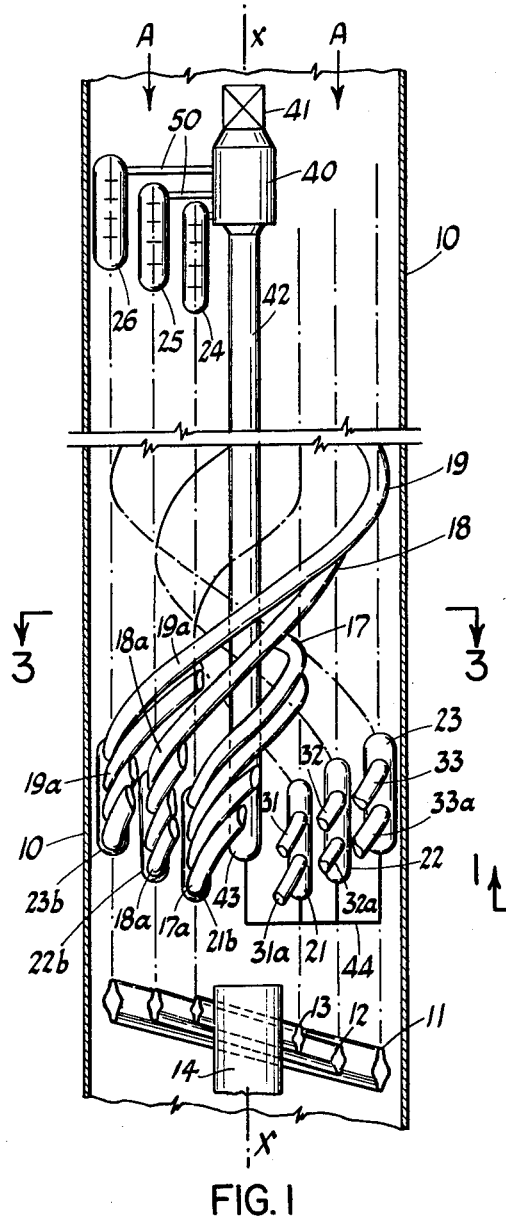
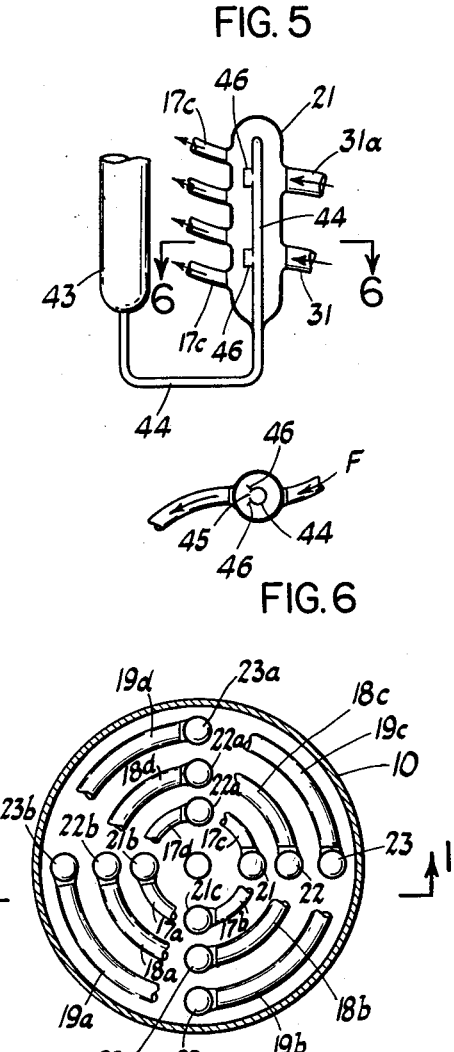
FIG. 1, FIG. 3, FIG. 5, FIG. 6
INVENTOR
ANDRE HUET

United States Patent Office 3,130,779
Patented Apr. 28, 1964

3,130,779
LIGHT BOILER FOR NUCLEAR ENERGY INSTALLATION
André Huet, 48 Ave. du President Wilson, Paris 8, France
Filed Apr. 29, 1959, Ser. No. 809,712
Claims priority, application France May 5, 1958
3 Claims. (Cl. 165—146)

The present invention relates to heat exchange apparatus and particularly to improvements in the construction and arrangement of elements of a steam generating and superheating installation so as to provide a relatively light and compact apparatus especially adapted for nuclear heat exchangers.

The invention contemplates an arrangement of concentrically disposed fluid circuits made up of spirally wound-up tubes of different shapes constituting a forced circulation boiler in which the economizer and the evaporator sections are constituted in similar manner.

Therefore, in accordance with this invention, the evaporator of the boiler arranged inside a cylindrical duct-casing the vertical axis of which is traversed by the heating fluid, is constituted by a number of circuits of spirally wound-up tubes forming drums or cylinders of increasing diameter, co-axial to the axis of the boiler. These cylinders are fed in parallel. From one cylinder to the other the shape adapted for the tubes continues to increase from those nearest the axis towards those adjacent the periphery of the evaporator.

In each cylinder the pitch for all its spirally wound tubes is the same; however, these pitches may vary from one cylinder to the other, for instance, by decreasing from the periphery towards the axis. The pitches are chosen in such manner that the incline of the tubes lies preferably between 28 and 60 degrees, without these limits being absolute. The pitches can all have the same direction for all cylinders; or, contrariwise they may alternate from one direction to the other in passing from one cylinder to the following cylinder. The pitches adapted for evaporator tubes can also be in a direction opposite to those adapted for economizer tubes. Likewise, the spaces existing between the cylinders and serving as the axial passages for the heating fluid may vary from one drum to the other.

The different tubular circuits can be constituted by either smooth or finned tubes, or specially shaped tubes, for instance of lenticular profile. In each cylinder the whorls, instead of being contiguous, can be spread apart; the size of these spaces can vary from one cylinder to the other. It is possible to utilize smooth tubes for the constitution of certain cylinders, for instance those being located near the axis, and shaped tubes for the outside cylinders. A combination of straight tubes can also be used for the cylinders located near the periphery together with spirally wound-up tubes for the cylinders closer to the axis.

With tubes having closely pitched threads, the boiler can also operate at reduced capacity with natural circulation.

All of these arrangements permit utilization of the heating fluid in a similar manner at all points transversely of the stream of heating fluid that brushes the tubes in order to fully exhaust its heat in a homogeneous manner. Moreover, this permits obtaining an even heating of the fluid inside of each of the tube circuits traversed in parallel by water and the steam.

At the outlet of each evaporator a water and steam separator is provided, and the excess water carried along is returned to the point of the circuit where the water inside the tubes has reached the saturation temperature.

The following description when read in connection with the accompanying drawings of illustrative arrangements will assist in better understanding the manner in which the invention can be practised.

FIGURE 1 is a schematic elevational view partly in cross section of a two fluid heat exchanger embodying the invention.

FIGURE 2 is a developed view showing the relations of the spirally wound tube coils constituting a single drum or cylinder among those making up the heat exchanger.

FIGURE 3 is a horizontal cross sectional view on line 3—3 of FIG. 1.

FIGURE 4 is a fragmentary view similar to FIG. 1 showing a modified disposition of the heat exchange coils.

FIGURE 5 shows schematically on a larger scale the lower part of the apparatus of FIGURE 1 and illustrates the arrangement for the return of water from a separator to the coil inlets.

FIGURE 6 is a cross section on line 6—6 of FIG. 5.

The boiler of this invention has a cylindrical duct-casing 10 traversed from top to bottom in the direction of arrow A by the fluid whose heat it is desired to absorb, such as gas employed to cool a nuclear reactor. At the lower part of the boiler, an economizer is provided formed by three drum-like cylindrical coils 11, 12, 13 consisting of tubes spirally wound into coils having the same axis as the longitudinal axis X—X of the boiler casing or duct 10. These coils are mounted concentrically around a core member 14 that fills the central space and acts as a baffle to direct the stream of gases over the coil surfaces rather than through the central space. As can be seen, the diameter of these tubes increases from the outer coil 13 towards the central coil 11. The tubes are preferably of lenticular form in cross section since this shape is particularly well adapted for arrangement to form a continuous open ended cylindrical element whose exposed surfaces constitute boundary walls of adjacent passage through which the heating fluid (such as a gas) passes to impart its heat to another fluid (water or steam) flowing within the tubes that form the drum or cylinder.

According to the invention, the evaporator proper consists of three spirally wound-up tube sections so as to constitute three drums or cylinders 17, 18 and 19 co-axial with duct-casing 10 and whose diameter increases from drum 17 to drum 19.

As shown each cylinder consists of several sets 17a–d, (18a–d and 19a–19d) of four spirally wound-up tubes, with each series of four tubes (as 19a, 18a, 17a, FIGS. 1, 2 and 3) fed in parallel from lower supply headers, such as 21, 22, 23, respectively, for drums 17, 18, 19. There are four of these headers (such as 23, 23a–23c etc., FIG. 3) for each cylinder distributed symmetrically so that four spiral coils or a total of sixteen tubes make up each cylinder. The main axes of the headers are vertical.

More specifically, a cylinder such as 19 is made up of several intermeshed tube coils each consisting of four tubes spirally wound as a band and connected as a unit at their lower ends into vertical supply headers, which are spaced 90 degrees apart around the interior of casing 10 when four spiral coils are used to form the surfaces of the cylinder 19. The four tubes 19a of one coil lead out of a supply header 23b and spiral up as a band making several whorls or revolutions. The sets of tubes 19b, 19c and 19d of the three other coils making up the outer hollow cylindrical circuit 19 connect at their lower ends into supply headers 23c, 23, and 23a, respectively, and all these coils are fitted into the spaces left between the whorls of the other coils. Thus, the four intermeshed coils form an open ended cylinder or annulus whose outer and inner walls are continuous surfaces of the four tubes as 19a of a coil contact each other.

At the upper part, the spirally wound tubes for each cylinder 17–19 are connected to collector headers such as 24, 25, 26, there being four at the top for each cylinder as at the bottom.

Each inlet header such as 21 besides the four connections for tubes such as 17a is provided with tube necks 31, 31a, 32, 32a or 33, 33a, permitting the corresponding economizer tube coils 11, 12, 13 to be directly connected to it, as shown also on FIG. 5. In other words, the economizer circuit marked 11, which is constituted by the spiral coils of the cylinder at the extreme outside feed directly into headers 23, 23a, 23b, 23c of the outside cylinder 19 of the evaporator. This is indicated in FIG. 1 by the dot-dash lines between headers 11 and 22 at the right and headers 11 and 23b at the left. Headers 12 and 13 of the economizer are connected to inlet headers 22, and inlet headers 21 are fed by circuits connecting with the economizer headers 13. Connections for headers with the suffix "c" are in front of the plane of FIG. 1 while those designated "a" are obscured.

At the upper part, all collector headers such as 24, 25, 26 are connected to a central drum 40, at the outlet of which the water and steam mixture traverses a separator 41. The water which may remain from the mixture is returned through an axial duct 42 from the lower part 43 of which at the center of the evaporator pipes 44 radiate to rejoin the sets of headers 21, 22, 23, as shown on the right side of FIG. 1 for one header of each set.

Each pipe 44 extends into the inside of a header, such as 21c, for instance, as shown on FIG. 5, and openings 45 are provided in pipes 44 at the level of the entering water coming from economizer drum 13 through necks 31, 31a. Furthermore, small deflecting surfaces 46 are provided on both sides of these openings 45 (FIG. 6). In this manner the water coming from the economizer in the direction of arrow F carries along with it through a suction effect the return water entering through pipes 44, and leaving through openings 45 in pipes 44 so as to send it on mixed with the economizer water in the evaporator tubes 17c leaving from header 21c.

As has been stated in the introduction to the description, the individual tubes 17a, 18a and 19a each constituting coils in the evaporator cylinders 17, 18, 19 can be smooth or finned tubes. The pitch adapted for the spiral winding of the tubes into coils can be in the same direction (as in FIG. 1) or in opposite direction (as for drum 17 in FIG. 3) and also may vary according to the location of the cylinder by decreasing in pitch, for instance, from cylinder 19 to cylinder 17. The closest pitch with smooth tubes can be adapted for making up the cylinder 19 of tubes 19a. These tubes may be of circular shape, or be deformed to a lenticular shape. Further, the diameter of these tubes may vary from one cylinder to the other. As shown in FIG. 1 the diameter of these tubes is larger in the tubes of the outside cylinder 19 and decreases in the tubes towards inside cylinder 17.

The lateral spacing between the three cylinders 17, 18, 19 which is shown to be the same on FIG. 1, may vary passing from the axis towards the periphery. Moreover, the cylinders can be executed either with tubes having contiguous whorls, or by leaving gaps axially between the different whorls; these spaces can vary passing from one cylinder 17 to cylinder 19.

On the example shown, each of the cylinders 17, 18, 19 is formed by the winding up of sixteen tubes fed in parallel. The number of these tubes can vary from one cylinder to the other. Furthermore, the tubes can be contiguous on one cylinder and be more or less variably spaced on the other cylinders.

All of these combinations allow obtaining, as has been stated above, the most rational absorption of the heat from the fluid circulating in the direction of arrows A through the inside of the duct-casing 10 while at the same time ensuring a uniform heating of the water and steam stream passing in each of the tube circuits fed in parallel.

The direction of the thread for economizer cylinders 11, 12, 13, could be opposite to that adapted for winding the tube coils of the evaporator and the connections between the different circuits or cylinders of the evaporator vary according to the direction adapted for the threads. It may be noted that the headers such as 21, 22, 23, or 24, 25, 26 are located substantially on the surface of or in alignment with cylinders 17, 18, 19, this has the effect of avoiding the pressure losses which would be caused if they were so located as to impose an obstacle in the direction of the flow of the fluid A. The axis of the headers need not necessarily be vertical, but could be oblique, at the same time leaving the headers substantially on the surface of the cylinders. At the upper part, headers 24, 25, 26 are connected either directly or by means of radiating tubes 50, as shown on FIG. 1, with the central drum 40 into which they discharge tangentially in such manner that the drum 40 being traversed by a helicoidal flow of water and steam, constitutes first separator ahead of the separator 41.

What I claim is:

1. A boiler having a casing containing heat exchanger tubes constituted by a plurality of tubes wound helically to form fluid circulating circuits co-axial with the axis of the casing and arranged in parallel, the tubes being spirally wound up to constitute a plurality of cylindrical drums co-axial with the duct casing and the diameter of said tubes increasing from the central to the most exterior drum, a plurality of spirally wound tubes being wound up to form each cylindrical drum; vertical inlet and outlet headers disposed so that their axes aline with the wall of each cylindrical drum, a plurality of such headers being provided at the base and at the top of each cylindrical drum and connected to said tubes, the tubes of each cylindrical drum being wound in contact in order to make a continuous wall on the surface of each cylindrical drum.

2. A heat exchanger as recited in claim 1 characterized in that the space between the different drums varies when passing from the axis of the boiler casing toward the periphery.

3. A water tube boiler according to claim 1 wherein the tubes are of lenticular cross section.

References Cited in the file of this patent
UNITED STATES PATENTS

| | | |
|---|---|---|
| 531,756 | Whitlock et al. | Jan. 1, 1895 |
| 1,752,452 | Nason | Apr. 1, 1930 |
| 1,825,433 | White | Sept. 29, 1931 |
| 1,892,778 | Black | Jan. 3, 1933 |
| 2,160,898 | Peff | June 6, 1939 |
| 2,693,941 | Bystrom | Nov. 9, 1954 |